Dec. 30, 1952           S. M. BAGNO          2,623,931
CIRCUIT FOR DETECTION OF FREQUENCY DIFFERENCES
AND APPARATUS EMPLOYING SAME
Original Filed Sept. 26, 1947          3 Sheets—Sheet 1

INVENTOR.
SAMUEL M. BAGNO
BY
James and Franklin
ATTORNEYS.

Patented Dec. 30, 1952

2,623,931

UNITED STATES PATENT OFFICE 2,623,931

CIRCUIT FOR DETECTION OF FREQUENCY DIFFERENCES AND APPARATUS EMPLOYING SAME

Samuel M. Bagno, Astoria, N. Y., assignor to The Alertronic Protective Corporation of America, New York, N. Y., a corporation of New York Original application September 26, 1947, Serial No. 776,368. Divided and this application December 4, 1948, Serial No. 63,585

21 Claims. (Cl. 175—320)

The present invention relates to a novel circuit for the detection of frequency differences and to the use of such a circuit to actuate a switch or other control device depending upon the existence or nonexistence of such a frequency difference. The use of such a circuit is here disclosed in conjunction with an apparatus for detecting motion in a confined space as disclosed more fully in applicant's copending application, Serial No. 776,368, filed September 26, 1947, and entitled "Method and Apparatus for Detecting Motion in a Confined Space," of which this application is a division. It will be understood, however, that the subject matter of this application may be used in apparatus other than that disclosed in the parent application.

The method and apparatus of the parent application constitutes a burglar and fire alarm which is actuated by reason of the fact that motion of an intruder in a given space or the existence in such a space of a thermal disturbance, be it fire, an overheated radiator, or the like, when such a space is filled with vibrations of a predetermined frequency or frequencies, preferably of supersonic value, will give rise to the existence, in such a space, of effective frequencies of vibration differing from the predetermined frequencies and normally differing from said predetermined frequencies by an amount of a different order of magnitude from said predetermined frequencies.

When those sound vibrations of different frequencies are converted into electrical vibrations of corresponding frequencies, and when those electrical vibrations are passed through a detecting apparatus capable of distinguishing between the frequencies and of actuating some control mechanism, such as a switch which controls an alarm, on the basis of the presence or absence of such differing frequencies, an operable alarm system is produced.

The circuit and control apparatus as herein disclosed are particularly adapted for use in such a detecting apparatus. By properly electrically combining a plurality of rectifiers and frequency discriminating networks, a circuit arrangement is produced which gives rise to different outputs depending upon the presence or absence of frequencies of predetermined magnitudes. Also disclosed herein is a control circuit actuated by certain signals from said frequency discriminating circuit, said control circuit being so arranged as to actuate a switch or other control device in accordance with the signals produced by the frequency detecting circuit.

It is the prime object of the present invention to devise a novel type of frequency detecting circuit particularly adapted to detect and signal the presence or absence of two dissimilar frequencies.

It is another object of the present invention to combine the said frequency detecting circuit with a control circuit which is capable of actuating a switch or other control device in accordance with the presence or absence of said two different frequencies.

Yet another object of the present invention is to devise a combination of frequency discriminating circuit and control circuit so constructed and arranged as to cause an alarm or other signal to be actuated whenever two specified frequency or frequencies within two specified ranges are present and effective to keep said alarm or other signal from being actuated when only one of said frequencies or ranges of frequencies is present.

A still further object of the present invention is to devise a combination frequency discriminating circuit and control circuit which is positive in operation and which will, should any part of the circuit fail, cause the alarm or other signal to be actuated.

To the accomplishment of the foregoing objects and such other objects as may hereinafter appear, the present invention relates to the arrangement of a frequency discriminating circuit and a control circuit associated therewith, all as defined in the appended claims and as described in this specification, taken together with the accompanying drawings, in which:

Figure 1:
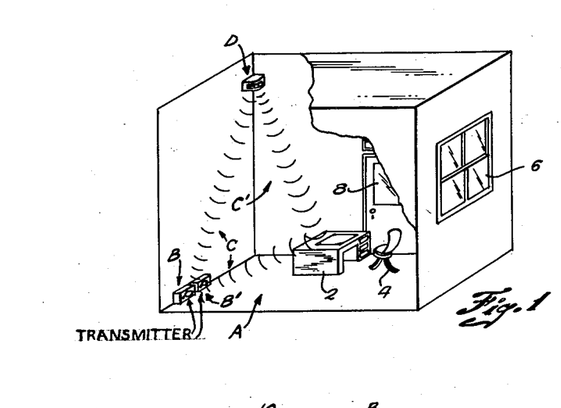
Fig. 1 is a schematic representation of a confined space such as a room which is equipped with the apparatus for detecting motion as described in the parent application, said apparatus including the frequency detecting circuit and control circuit of the present invention.

Since one of the most important applications of use of the present invention is in a burglar or fire alarm of the type disclosed in the parent application, the illustration of Fig. 1 shows the manner of employment of such a motion detecting apparatus. In a confined space such as a room A, some of the walls of which are broken away in Fig. 1 to show the interior thereof, one or more transmitters B are positioned so as to transmit vibrations designated by the curved lines C into the room A. The frequency of these vibrations is preferably chosen to be somewhat higher than the range of frequencies audible to the human ear so that the operation of the equipment will be unknown to the would-be intruder and so that it will not interfere with the sensibilities of passers-by or those working adjacent to the room in which the apparatus is functioning. The contents of the room, here illustrated as a desk 2 and a chair 4, and the walls thereof will reflect the vibrations C, these reflected vibrations being designated by the curved lines C'. For purposes of illustration, these reflections are shown as coming only from the desk 2, but it will be understood that the entire room A is filled both with the transmitted vibrations C and the reflected vibrations C'. A microphone D capable of receiving vibrations of the frequencies involved and converting those vibrations into corresponding electrical fluctuations is also mounted in the room, and is so positioned as to receive not only the reflected vibrations C' but the transmitted vibrations C. Since reflection takes place from all of the walls of the room, and since therefore, reflected waves are travelling in all directions, these reflected waves eventually, after repeated reflections and reflections reaching the microphone D, the direction of motion which the apparatus will detect is not critical. No matter in what direction the intruder moves or the air accelerates, it will change the effective frequency of some waves and thus will eventually control the alarm. If the room is undisturbed, that is to say, if the contents thereof remain stationary, if the air therein is not accelerated, and if nothing moves in the room, the frequency of the reflected waves C' will be equal to the frequency of the transmitted waves C. On the other hand, if there be a disturbance in the room, the waves C' which are reflected by the thing in motion will differ in frequency from the transmitted waves C insofar as the microphone D is concerned. Thus, if the desk 2 be moved toward the microphone D, the waves reflected therefrom will impinge upon the microphone D at a faster rate than if the desk 2 were stationary, or if the desk 2 be moved away from the microphone D, the waves C' reflected therefrom will impinge upon the microphone D at a slower rate. The difference in frequency between transmitted waves C and the reflected waves C' will therefore depend upon the speed with which the desk 2 is moved. Should a person enter the room, he, too, would reflect the transmitted waves C, and should he move, the waves C' reflected by him would appear to the microphone D as having a frequency different from that of the transmitted waves C. This effect is well known and is termed the "Doppler effect" in the literature. Since the frequency generated by motion within the room is derived from the original transmitted frequency, it might be considered in the sense that the original transmitted frequency is modulated by the motion within the room and hence what the microphone D receives is the original transmitted frequency and its modulation.

Since the transmitted waves C must pass through the air in the room A, the condition of the air must also be taken into account. If the air is in motion and accelerating, the transmitted waves C carried thereby will, when they impinge upon the microphone D, have an apparent frequency equal to the transmitted frequency as modified by the motion of the air. Because of the fact that the transmitted waves C will reach the microphone by diverse routes, some of the waves travelling directly thereto (see the vertical wave train of Fig. 1) and other of the wave trains C reaching the microphone by a more diverse route (see the reflected wave train C' of Fig. 1), an effective difference in frequency will be detected by the circuit to which the microphone is connected.

Thus, if the window 6 or the door 8 of the room A be opened and if a draft enter therein, the air in the room A will be accelerated and thus the microphone D will detect frequency differences. Moreover, if any portion of the room be subjected to undue thermal disturbances, the air in the vicinity of those thermal disturbances will have considerable turbulence, naturally accompanied by acceleration. The motion of that portion of the air will so affect the transmitted waves C passing therethrough that when those waves are reflected and finally reach the microphone D, the circuit to which the microphone is connected will detect a frequency difference.

It will therefore be apparent that the disclosed method for detecting motion will be effective not only in detecting any motion of an intruder within the room A but will also be effective to detect any excessive air acceleration such as might be caused by a broken window or by undue thermal disturbance such as fire.

A certain amount of thermal disturbance in a room, and consequently a certain amount of air turbulence connected therewith, must be allowed for. If the room has a radiator and the radiator is in operation, air turbulence and acceleration will be present and it is necessary that any workable alarm system be so designed as not to be set off by such normal turbulence, the alarm only being soundable when the thermal disturbance exceeds the normal amount.

I have found that occasionally the placing of objects in the room sets up such a standing wave pattern that the microphone D is located at a null point. This furnishes the basis for detection in Patent No. 2,071,933. I have found that in a practical system, not only is such an arrangement not desirable, but it must be avoided at all costs lest, in the event of such an accidental set-up, the detecting apparatus may be rendered overly sensitive. Since it may often be impractical, particularly in warehouses or the like, to shift the position of the contents thereof to conform to the peculiarities of the intruder detection apparatus, and since normal variations in the thermal condition of the room may cause the null point of the standing wave pattern to shift with respect to the microphone position at any time, it is essential that means be provided to eliminate this possibility.

To this end, I so relate the transmitting and receiving elements B and D as to ensure that reception never takes place at a null point of a standing wave pattern. This may be accomplished in varying ways, but insofar as the present invention is concerned, only one way, involving the employment of a pair of transmitters, each operating at a different frequency, need be disclosed in order that the invention be properly understood.

I have discovered that if two transmitters B and B' are employed, each transmitting vibrations at a fixed frequency of the same order of magnitude as the other but differing from one another by an amount exceeding the maximum detectable frequency, and preferably exceeding the maximum detectable frequency by so great a degree as to be of a different order of magnitude therefrom, the effect of standing waves is substantially eliminated. The position of the null point of a standing wave pattern is determined by, among other things, the frequency thereof. If two appropriately related separate frequencies are employed, the microphone D can never be at the null point of both frequencies and consequently the microphone D is always in position to detect irrespective of the positioning of the objects in the room A or of the normal thermal variations therein. I prefer that the frequencies of the two transmitters be between 18 and 20 kc. per second and that they differ from one another by an amount on the order of 1 kc. per second, 1 kc. per second being of a truly different order of magnitude from the maximum detectable frequency difference of the detectable frequency differences of between about 3 and 180 cycles per second.

Figure 2:
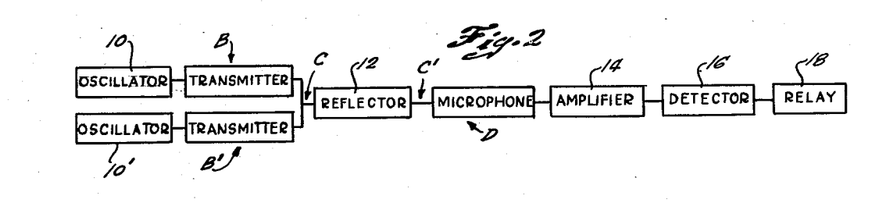
Fig. 2 is a block diagram illustrating the broad steps inherent in one method of motion detection employed therein.

This system and the apparatus employed to effectuate it is shown in schematic form in the block diagram of Fig. 2. Two transmitters B and B' are employed each of which is controlled by a separate oscillator 10, 10' so that the waves C generated by the transmitter B will be sent out into the confined space A, there to impinge upon whatever air turbulence exists and to be reflected by whatever objects are contained therein as well as by the walls thereof. The waves C' leaving the reflecting object generally designated 12 are picked up by the microphone D which converts them into corresponding electrical fluctuations, these fluctuations being amplified in amplifier 14 and then sent out to a detector 16 where the frequencies of the received vibrations are compared in order to determine whether a frequency difference exists. This may be accomplished by combining all the received frequencies, if there be more than one frequency, and in therefore creating a beat frequency which will correspond to the difference between the frequencies. The thus detected frequency difference, if of sufficient magnitude and amplitude, will actuate relay 18 so as to set off any desired sort of sensible alarm.

*Circuit construction*

Figure 5:
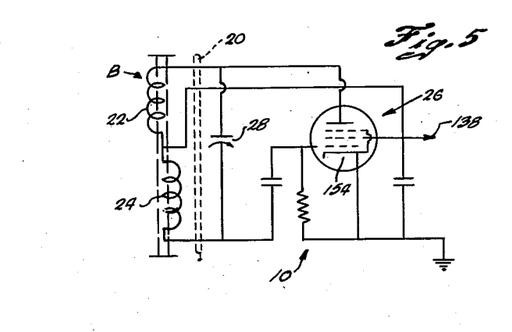
Fig. 5 is a circuit diagram typical of the transmitters employed in the present invention.

In the embodiment here disclosed, each of the transmitters B and B' and the oscillators 10 and 10' associated therewith may be identical and consequently a description of a single oscillator and a single transmitter will suffice for both. A typical circuit arrangement is illustrated in Fig. 5. Conventional loud speakers are ordinarily not capable of efficiently projecting vibrations at supersonic frequencies. Accordingly, I prefer to employ so-called magnetostriction transmitters which rely, for vibration of their diaphragms, upon the change of length of a magnetostriction rod 20 when subjected to varying magnetic field conditions. However, my invention is not to be limited to this specific type of transmitter. The variation in length of such magnetostriction rods is of a very small order of magnitude such as a few parts to a millionth of the length of the rod. However, if the rod be tuned to the frequency of transmission, it will resonate at that frequency and thus give rise to vibrations of considerably greater amplitude. Consequently, each transmitter B must contain a magnetostriction rod 20 tuned to the desired frequency of transmission. The magnetic fields of force active upon the rod 20 are provided by magnetostriction coils 22 and 24 which are here shown as connected to any suitable oscillator circuit generally designated 26. The frequency of oscillation of this vibrator circuit may be controlled by means of adjustable condenser 28. The details of the oscillator 10 and of the transmitter B may vary within wide limits as is well known to those skilled in the art, and their details form no part of the present invention.

The circuit construction of the detector 16, its connection with the relay 18, and its correlation with the various power sources therefore do, however, present many inventive features. The sequence of operations in the detector are shown in a schematic way in Fig. 3. The output from the amplifier, which consists of electrical fluctuations of frequencies corresponding to the sound waves received by the microphone D and thus having frequencies corresponding to the transmitted waves C and the reflected waves C', is fed to the tuned circuit 30 the output of which is still further amplified by amplifier 32 and then rectified by rectifier 34. If the sound waves received by the microphone D all have the same frequency, the output of the rectifier 34 will be constant. On the other hand, if the microphone D receives sound vibrations of differing frequencies, those two frequencies when combined in amplifier 14 will give rise to an output having a varying amplitude the frequency of which will correspond to the frequency difference between the received vibrations. Hence, the output of the rectifier 34 will vary in accordance with the frequency difference received by the microphone D, both as regards amplitude and frequency.

Figure 3:
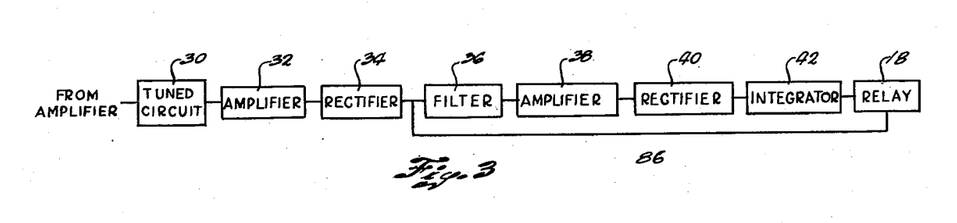
Fig. 3 is a block diagram illustrating the details of the detector step, said step including the frequency detecting circuit and control circuit of the present invention.

Since a pair of transmitters B are employed, each transmitting at a different frequency from one another by, say 1 k. c. per second, there will normally be present in the output of the amplifier 14 a beat having a frequency equal to 1 k. c. per second. The output of rectifier 34 will fluctuate correspondingly. If, because of the motion of an intruder in the room A, the reflected waves C' differ in frequency from the transmitted waves C, there will be present in the output of the amplifier 14 a beat having a frequency corresponding to the speed of motion of the intruder, this beat having a frequency between, for example, 3 and 180 cycles per second. The output of the rectifier will vary accordingly.

This output is then fed to a filter circuit 36 so designed as to reject all frequencies below the desired minimum detectable frequency as well as those high frequencies corresponding to the difference between the two transmitted frequencies. In addition, the filter circuit is so designed that the minimum passable frequency may be controlled so that the sensitivity of the equipment to thermal disturbances and the like may be adjusted. Thus, the filter may be set to pass only frequencies above 3 cycles per second, in which case motion of an intruder at the rate of 2 inches per second will be detected but thermal disturbances other than those caused by a direct flame will not be detected. The minimum passable frequency might be set at a lower value, say, 2 cycles per second, in which case the apparatus will detect motion of an intruder at less than 2 inches per second, but would also detect thermal disturbances caused by, for example, a hot radiator. A minimum frequency of between 3 and 15 cycles per second has been found to be a safe value for an intruder alarm as distinguished from a fire alarm.

The output of the filter 36 is fed to amplifier 38 and is then rectified in rectifier 40. If the frequencies received by the microphone D are only those of the two transmitters B and B', the input to the rectifier 40 will be steady and consequently no output will result. This will be the situation when no intruder is present or when no excessive thermal disturbances obtain. However, if an intruder be moving, there will be an alternating current output from the filter 36 which can be rectified by the rectifier 40 and an output therefrom will result. This output is sent to an integrator 42 which permits the successive rectifications of the alternating current corresponding to the detected frequency difference to accumulate until their sum becomes strong enough to operate the relay 18 and thus set off an alarm of whatever nature is desired.

The rectifier 34, filter 36, and rectifier 40, together with the integrator 42 where employed, constitute the frequency detecting circuit. When the output of the microphone D is considered to consist of the original transmitted frequency and its modulation, then the rectifier 34 may be considered as performing a demodulating function while the rectifier 40 rectifies the demodulated output of the rectifier 34. It will be noted from Fig. 3 that the output of rectifier 34 is also fed to relay 18. The purpose of this will become apparent upon consideration of the circuit diagram of Fig. 4. The microphone D which, for the frequencies under discussion is preferably of a crystal type, has its output connected to the grid of an amplifier tube 44 the output of which is reamplified by tube 46. As here illustrated, the two tubes are formed in a single envelope. The amplification accomplished is approximately 15 times per stage or a total of 225 times. The output from tube 46 goes to volume control 48 which is manually adjustable so as to determine the sensitivity of the apparatus to amplitude. It is this adjustment which permits the apparatus to be set up so as to be affected by a human but not, for example, by a rat or a mouse.

Figure 4:
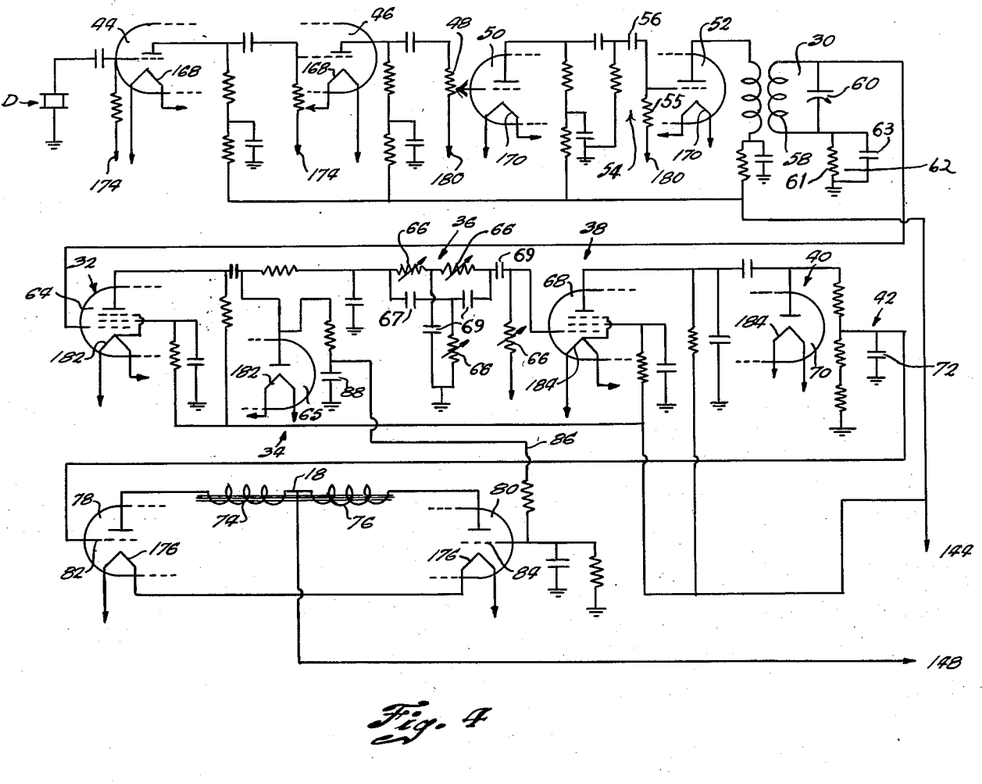
Fig. 4 is a circuit diagram showing the details of circuit design for the amplifier, detector, frequency detecting circuit, control circuit and relay.

From the volume control 48 two more stages of amplification by tubes 50 and 52 are accomplished, the tubes 50 and 52 being here shown as contained in a single envelope similar to the tubes 44 and 46. The input of tube 52 is connected in a self-biasing arrangement designated generally by the numeral 54 so that a signal strong enough to drive the grid positive will produce, by grid rectification, enough charge on the condenser 56 to effectively neutralize the positive peak of the signal. Hence, when the signal fluctuates in amplitude, as it will when different frequencies are received by the microphone D, the positive influence of the fluctuations will take place in a region where the grid of the tube is biased sufficiently negative due to the self-biasing arrangement 54 to make the plate of the tube respond to the fluctuations in a manner such that the percentage modulation of the signal leaving this stage in amplification is increased because most of the signal, as it goes from its positive to its negative peak during the course of one cycle, will be beyond the negative cut-off point of the grid of the tube 52. This leaves but a small positive portion of the signal acting within the effective control range of the grid of the tube 52, and any fluctuations in amplitude of the total signal will be considerably magnified insofar as the output of the tube 52 is concerned due to the fact that those fluctuations will cover a much larger portion of the small positive signal which will control the grid of the tube 52 than of the total signal. The self-biasing circuit 62 described in the next paragraph operates in a similar manner.

This signal is fed to a tuned circuit 30, here shown as comprising a capacitance 60 and an inductance 58 connected in parallel so as to form a parallel resonant circuit, the tuned circuit 30 being tuned to approximately 19 k. c. so as to further amplify the modulated signal. A self-biasing arrangement 62, similar to the arrangement 54, further increases the percentage modulation of the signal fed to the final amplifier stage 32 represented by tube 64.

The output of the amplifier stage 32 is fed to rectifier 34 here shown in the form of diode 65 the output voltage of which follows the influence of the signal and consequently generates a beat frequency representing the difference between the frequencies received by the microphone D. This output is fed to filter 36 which may be a network formed of capacitances and resistors, the resistors 66 being adjustable so as to control the pass characteristics of the filter. It is by means of this adjustment that the minimum and maximum detectable frequencies of the apparatus may be varied, thus varying the minimum and maximum detectable speeds of motion and the minimum and maximum detectable thermal or air disturbances. The filter 36 will not pass frequencies on the order of 1 K. C. and consequently the difference in frequency between the transmitters B and B' is blocked. The filter circuit 36 will however pass frequencies in a band having a lower limit of perhaps between 3 to 15 cycles depending on the undesired turbulence conditions, and an upper limit of 180 cycles per second and consequently those frequencies, corresponding to motion of an intruder or undue thermal or air disturbance, will pass to the amplifier stage 38 represented by tube 68 the output of which is fed to the rectifier stage 40 represented by tube 70. As here illustrated, the tubes 68 and 70 as well as the tubes 64 and 65 are enclosed in a single envelope.

If the only detected frequency difference is that between the two transmitters B and B', no signal will pass the filter 36. There will be no input to the amplifier 38, and there will consequently be no output from the rectifier 40. If however, there is a frequency difference detected between, say, 3 and 180 cycles per second, an alternating current of that frequency will be passed by the filter 36, amplified by the amplifier 38 and rectified by the rectifier 40 so that an output will be obtained from the latter. As here illustrated, only half wave rectification is obtained and the rectified impulses are fed to an integrator 42 here shown as a condenser 72 which serves to accumulate the rectified impulses and build up a charge which is then fed to relay 18 so as to operate the same.

It therefore will be appreciated that the frequency detecting circuit of the present invention will have two outputs, one from the rectifier 34 which is dependent upon the existence of a given frequency and one from rectifier 40 which is dependent upon the existence of a different frequency, the filter circuit 36 serving to separate the two recifiers 34 and 40 and to permit only the second frequency, when present, to pass to the rectifier 40.

Control circuit

My control circuit and its manner of connection present many inventive features, particularly when employed in conjunction with the frequency detecting circuit just described. It comprises a relay 18 which is composed of two opposed windings 74 and 76, a current through each being independently controlled by a separate tube 78 and 80 which for convenience may be combined into a single envelope. The output of the integrator 42 is connected to the grid 82 of tube 78. The grid 84 of tube 80 is connected by means of electrical connection 86 (see Figs. 3 and 4) to the condenser 88 which is in turn connected to the output of the rectifier 34. The condenser 88 acts as an integrator in the same manner as the condenser 72.

Whenever there is an output from the rectifier 34, which will be whenever both transmitters B and B' are operating and the tubes 44, 46, 50, 52, 64 and 65 are all functioning properly, the grid 84 of tube 80 will be so biased that no current will flow through the tube 80 and consequently no current will flow through the winding 76. Should any portion of the system before and including the condenser 88 fail, this negative bias will be removed from the grid 84 and current will flow through the tube 80 and the winding 76. The winding 76 is so wound in conjunction with the armature of the relay 18 that current flowing therethrough will cause the relay to trip and thus set off whatever alarm is desired. Consequently, upon failure of the apparatus, the alarm will be set off.

The tube 78 normally passes current, which current flows through the winding 74, thus tending to hold the relay out of its tripping position. The output of the rectifier 40 as integrated by the condenser 72, which output is present when a frequency difference corresponding to motion of an intruder is detected, puts a negative bias on the grid 82 of tube 78, thus cutting off current flow to the winding 74 and thus permitting the relay to trip and set off the alarm.

It will therefore be apparent that during normal operation of the apparatus, when no intruder is detected, current flows through winding 74 and no current flows through winding 76, the winding 74 being wound in a sense such as to keep the relay from tripping. When an intruder is detected, the current through winding 74 is cut off and the relay trips, setting off a sensible alarm. Should the apparatus fail (by apparatus is included the oscillator 10 and the transmitter B as well the other elements thereof), there will be no bias on either of the grids 82 or 84 and consequently current will flow through both of the coils 74 and 76 but, since they are wound in opposed senses, they will neutralize one another and the relay will trip, setting off the alarm. By this arrangement, the apparatus is rendered relatively foolproof; any tampering with it or disconnection or failure of any part will cause the alarm to be set off.

Figure 6:
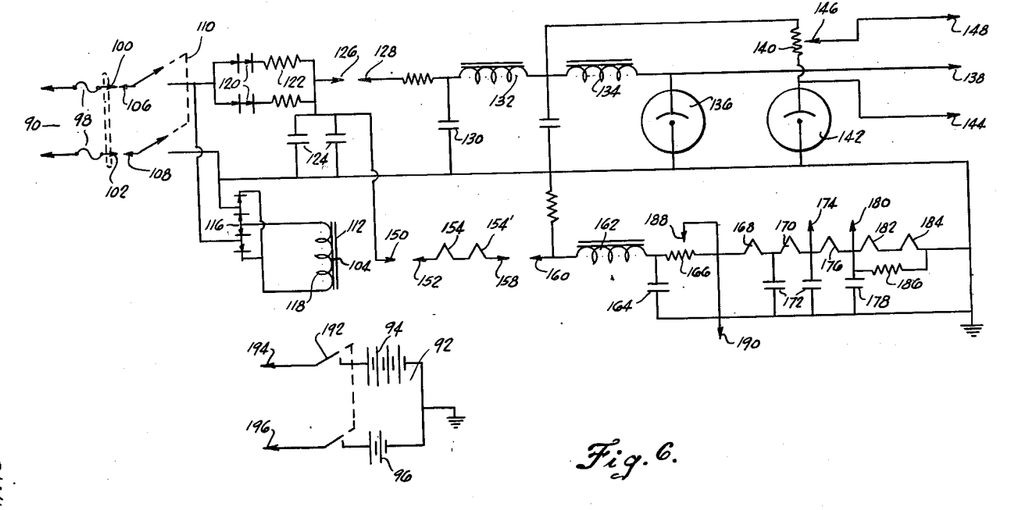
Fig. 6 is a circuit diagram of the power supply connections for the electrical apparatus of Figs. 4 and 5.

Although anyone skilled in the art of circuit design can fully understand the circuits shown in Figs. 4, 5 and 6 and can compute proper circuit values to achieve the described results, for purposes of clarity certain of the more significant circuit values will be now set forth. Tubes 44, 46 and 50, 52 may be of the type 3A5. Tubes 64, 65 and 68, 70 may be of the type 1S5. Tube 78, 80 may be of the type 3A5. In the self-biasing circuit 54, the resistor 55 may have a value of 2 megohms and the capacitor 56 may have a value of .1 microfarad. In the self-biasing circuit 62 the resistor 61 may have a value of 2 megohms and the capacitor 60 may have a value of .1 microfarad. In the resonantly tuned circuit 30 each of the primary and secondary of the transformer 58 may have an inductance of 30 millihenries, the coupling coefficient between the coils being close to unity, while the capacitor 60 may be variable between .0005 microfarad and .0015 microfarad. The integrating condenser 72 may have a value of .5 microfarad and the integrating condenser 88 may have a value of .01 microfarad. In the filter circuit 36, the resistors 66 may be variable between .25 and 5 megohms, the capacitor 67 may have a value of .04 microfarad and the capacitors 69 may each have a value of .01 microfarad.

Power supply

The power supply for the apparatus is shown in Fig. 6 and is there illustrated as being adapted for use with a primary power source of alternating current 90 and a secondary power source of direct current 92, the latter comprising a B-battery 94 of approximately 135 volts and an A-battery 96 of approximately 12 volts. The alternating current source 90 may comprise a 110 volt source, such as is commonly found in industrial and residential locations, which leads to fuses 98 and to contact points 100 and 102, these points being connectable to points 106 and 108. An on-off switch 110 is provided so that the apparatus may be turned off while the room A is occupied but may be turned on when it is desired that the apparatus operate to detect an intruder. The relay 104 is connected across the alternating current line and is provided with an armature 112 which controls contact making blades (not shown). Selenium rectifiers 116 are interposed between the coil 118 of the relay 104 and the alternating current source 90 so that uni-directional current passes through the coil 118 in an amount determined by the magnitude of the alternating current or primary power source 90. So long as that magnitude exceeds a certain critical amount, the contact blades will take up a position to cause the apparatus to be energized by the alternating current source 10. This source is connected to the apparatus via selenium rectifiers 120 each having a protective resistor 122, the rectifiers charging electrolytic condensers 124 which, through the relay contacts 126 and 128, charge another electrolytic condenser 130. A filter system generally designated 132 follows to smooth ripples in the rectifier output. From here the power supply is divided into two sections, one comprising a choke coil 134 in series with a voltage regulator tube 136 which supplies voltage at a point designated 138 for the oscillator 26. The other section consists of a resistor 140 and a voltage regulator tube 142 which supplies voltage for the input audio amplifier stages at point 144. The resistor 140 is tapped by means of movable connector 146 which supplies voltage to point 148 and thence to the tubes 78 and 80 via the relay windings 74 and 76.

Also leading from the condensers 124 across the input is a circuit comprising contacts 150 and 152, in series with which are the filaments 154 and 154' for the tubes of the oscillator 26. From here the electrical circuit goes through contact points 158 and 160 and choke coil 162 to another filter condenser 164 and through resistor 166 to the filaments 168 and 170 of tubes 44, 46, 50 and 52, each of these filaments being protected by means of by-pass condensers 172. Point 174 is connected to the corresponding points 174 in Fig. 4. The filament 176 for the relay tubes 78 and 80 is next in line and also provided with a by-pass condenser 178 and point 180 is connected to the corresponding points 180 of Fig. 4. The filaments 182 and 184 for tubes 64 and 66 and tubes 68 and 70 respectively are next in line, these being provided with by-pass resistor 186. The resistor 166 is provided with movable tap 188 which leads to contact point 190.

The direct current supply 92 is provided with an individual on-off switch 192 which is normally closed and the high potential sides of the B and A batteries 94 and 96 lead to contact points 194 and 196.

The frequency detecting circuit above described and the control circuit with which it is employed provide a means of actuating any external control device in accordance with the presence or absence of a plurality of frequencies. As here illustrated, the control device is actuated only when both frequencies are present or when neither frequency is present. This has the advantage that it will cause the alarm to be actuated whenever the power supply or any portion of the circuit should fail. It is, of course, equally possible to employ the frequency detecting circuit and control circuit of the present invention so as to actuate the external control device when only one of the frequencies is present, but not when both are present, if that should be deemed desirable in a given application. It will also be apparent that many variations may be made in the mode of achieving rectification and integration, and that integration need not be employed if the other circuit conditions so permit. Many other changes may be made in the details of the disclosure of this application without departing from the spirit of the invention as defined in the following claims.

I claim:

1. Electrical apparatus for detecting the presence or absence of two frequencies of electrical fluctuation in an original signal and actuating a switch means in response thereto comprising a principal circuit for receiving said original signal at one end thereof, a first rectifier connected in said principal circuit after said one end for rectifying said fluctuations and a second rectifier connected in said principal circuit after said first rectifier for rectifying the electrical output of said first rectifier if said output is non-constant, a relay switch having first and second windings effective when energized to oppose one another, first and second tubes each having a control electrode and an output electrode, the output electrode of each tube being connected to one of said windings so that the current through each tube will energize the respective windings, and a pair of integrating circuits each connected between the control electrodes of said first and second tubes respectively and a point in said principal circuit after said first and second rectifiers respectively, said tubes being biased in such a way that the current through said tubes will be altered when the rectifiers connected thereto rectify fluctuating currents.

2. Electrical apparatus for detecting the presence or absence of two frequencies of electrical fluctuation in an original signal and actuating a switch means in response thereto comprising a principal circuit for receiving said original signal at one end thereof, a first rectifier connected in said principal circuit after said one end for rectifying said fluctuations and a second rectifier connected in said principal circuit after said first rectifier for rectifying the electrical output of said first rectifier if said output is non-constant, a relay switch having first and second windings effective when energized to oppose one another, first and second tubes each having a control electrode and an output electrode, the output electrode of each tube being connected to one of said windings so that the current through each tube will energize the respective windings, and a pair of integrating circuits each connected between the control electrodes of said first and second tubes respectively and a point in said principal circuit after said first and second rectifiers respectively, said tubes being biased in such a way that the current through said tubes will be decreased when the rectifiers connected thereto rectify fluctuating currents.

3. Electrical apparatus for detecting the presence or absence of two frequencies of electrical fluctuation in an original signal and actuating a switch means in response thereto comprising a principal circuit for receiving said original signal at one end thereof, a first rectifier connected in said principal circuit after said one end for rectifying said fluctuations and a second rectifier connected in said principal circuit after said first rectifier for rectifying the electrical output of said first rectifier if said output is non-constant, a relay switch having first and second windings effective when energized to oppose one another, first and second tubes each having a control electrode and an output electrode, the output electrode of each tube being connected to one of said windings so that the current through each tube will energize the respective windings, and a pair of integrating circuits each connected between the control electrodes of said first and second tubes respectively and a point in said principal circuit after said first and second rectifiers respectively, said tubes being biased in such a way that the current through said tubes will be cut off when the rectifiers connected thereto rectify fluctuating currents.

4. Electrical apparatus for detecting the presence or absence of two frequencies of electrical fluctuation in an original signal and actuating a switch means in response thereto comprising a principal circuit for reciving said original signal at one end thereof, a first rectifier connected in said principal circuit after said one end for rectifying said fluctuations, a filter circuit connected in said principal circuit after said first rectifier and effective to pass only fluctuations of frequencies within a predetermined range, and a second rectifier connected in said principal circuit after said filter circuit for rectifying the filtered electrical output of said first rectifier if said output is non-constant and has a frequency capable of being passed by said filter circuit, a relay switch having first and second windings effective when energized to oppose one another, first and second tubes each having a control electrode and an output electrode, the output electrode of each tube being connected to one of said windings so that the current through each tube will energize the respective windings, and a pair of integrating circuits each connected between the control electrodes of said first and second tubes respectively and a point in said principal circuit after said first and second rectifiers respectively, said tubes being biased in such a way that the current through said tubes will be altered when the rectifiers connected thereto rectify fluctuating currents.

5. The apparatus of claim 4, in which said filter circuit will pass frequencies only in a range having a minimum between 3 and 15 cycles per second and a maximum on the order of magnitude of 180 cycles per second.

6. The apparatus of claim 5, in which said filter circuit is adjustable so that the minimum of the passed frequency range may be varied.

7. The apparatus of claim 4, in which said filter circuit will pass frequencies in a range having a minimum between 3 and 15 cycles per second.

8. The apparatus of claim 7, in which said filter circuit is adjustable so that the minimum of the passed frequency range may be varied.

9. The apparatus of claim 4, in which said filter circuit is adjustable so that the range of frequencies which it will pass may be varied.

10. Electrical apparatus for detecting the presence or absence of two frequencies of electrical fluctuation in an original signal and actuating a switch means in response thereto comprising a principal circuit for receiving said original signal at one end thereof, a first rectifier connected in said principal circuit after said one end for rectifying said fluctuations, a filter circuit connected in said principal circuit after said first rectifier and effective to pass only fluctuations of frequencies within a predetermined range, and a second rectifier connected in said principal circuit after said filter circuit for rectifying the filtered electrical output of said first rectifier if said output is non-constant and has a frequency capable of being passed by said filter circuit, a relay switch having first and second windings effective when energized to oppose one another, first and second tubes each having a control electrode and an output electrode, the output electrode of each tube being connected to one of said windings so that the current through each tube will energize the respective windings, and a pair of integrating circuits each connected between the control electrodes of said first and second tubes respectively and a point in said principal circuit after said first and second rectifiers respectively, said tubes being biased in such a way that the current through said tubes will be decreased when the rectifiers connected thereto rectify fluctuating currents.

11. Electrical apparatus for detecting the presence or absence of two frequencies of electrical fluctuation in an original signal and actuating a switch means in response thereto comprising a principal circuit for receiving said original signal at one end thereof, a first rectifier connected in said principal circuit after said one end for rectifying said fluctuations, a filter circuit connected in said principal circuit after said first rectifier and effective to pass only fluctuations of frequencies within a predetermined range, and a second rectifier connected in said principal circuit after said filter circuit for rectifying the filtered electrical output of said first rectifier if said output is non-constant and has a frequency capable of being passed by said filter circuit, a relay switch having first and second windings effective when energized to oppose one another, first and second tubes each having a control electrode and an output electrode, the output electrode of each tube being connected to one of said windings so that the current through each tube will energize the respective windings, and a pair of integrating circuits each connected between the control electrodes of said first and second tubes respectively and a point in said principal circuit after said first and second rectifiers respectively, said tubes being biased in such a way that the current through said tubes will be cut off when the rectifiers connected thereto rectify fluctuating currents.

12. Apparatus for controlling a switch means in response to the presence or absence of one or more frequencies of electrical fluctuations in an original signal, the frequencies differing by an amount within a predetermined range, comprising a principal circuit having an input portion at one end for receiving said original signal, a first rectifier connected across said input portion, a second rectifier connected across said input portion after said first rectifier and electrically coupled to the output of said first rectifier, a filter circuit between said rectifiers effective to filter out all frequencies other than those of the desired frequency difference range, a switch having an actuating circuit sensitive to the presence or absence of a pair of switch signals, and independent direct electrical connections between said switch actuating circuit and the outputs of said first and second rectifiers, said first rectifier having an output defining a first switch signal when said original signal has at least one frequency of fluctuation, said second rectifier having an output defining a second switch signal, derived from re-rectifying a portion of the output of said first rectifier, when said original signal has more than one frequency of fluctuation.

13. The apparatus of claim 12, in which said filter circuit will pass frequencies only in a range having a minimum between 3 and 15 cycles per second and a maximum on the order of magnitude of 180 cycles per second.

14. The apparatus of claim 13, in which said filter circuit is adjustable so that the minimum of the passed frequency range may be varied.

15. The apparatus of claim 12, in which said switch actuating circuit is effective to actuate said switch in one sense when it receives neither or both of said switch signals and in another sense when it receives one of said switch signals alone.

16. The apparatus of claim 15, in which said filter circuit is adjustable so that the minimum of the passed frequency range may be varied.

17. Apparatus for controlling a switch means in response to the presence or absence of a modulation of one or more frequencies impressed upon an original signal which comprises a principal circuit having an input portion at one end for receiving said original signal, a switch having an actuating circuit sensitive to the presence or absence of a pair of switch signals, means in said principal circuit for demodulating said original signal, means electrically connecting a portion of the output of said demodulating means directly to said switch actuating circuit, a rectifying means, means electrically connecting a portion of the output of said demodulating means to said rectifying means, said last named connecting means including a filter effective to filter out all frequencies other than those of the modulation, and means for electrically connecting a portion of the output of said demodulating means to said rectifying means, said last named connecting means including a filter effective to filter out all frequencies other than those of the modulation, and means for electrically connecting the output of said rectifying means to said switch actuating circuit, said demodulating means having an output defining a first switch signal so long as said original signal is present, said rectifier having an output defining a second switch signal when said original signal has a modulation.

18. The apparatus of claim 17, in which said filter circuit will pass frequencies only in a range having a minimum between 3 and 15 cycles per second and a maximum on the order of magnitude of 180 cycles per second.

19. The apparatus of claim 18, in which said filter circuit is adjustable so that the minimum of the passed frequency range may be varied.

20. The apparatus of claim 17, in which said switch actuating circuit is effective to actuate said switch in one sense when it receives neither or both of said switch signals and in another sense when it receives one of said switch signals alone.

21. The apparatus of claim 20, in which said filter circuit is adjustable so that the minimum of the passed frequency range may be varied.

SAMUEL M. BAGNO.

REFERENCES CITED

The following references are of record in the file of this patent:

UNITED STATES PATENTS

| Number | Name | Date |
|---|---|---|
| 1,490,958 | Brown | Apr. 22, 1924 |
| 1,669,524 | Kintner | May 15, 1928 |
| 2,167,007 | Schott | July 25, 1939 |
| 2,382,847 | Baumann | Aug. 14, 1945 |
| 2,422,064 | Anderson | June 10, 1947 |
| 2,455,639 | Anderson | Dec. 7, 1948 |